United States Patent
Goswami et al.

(10) Patent No.: US 6,856,910 B2
(45) Date of Patent: Feb. 15, 2005

(54) METHOD AND APPARATUS FOR DETERMINING REGIONAL DIP PROPERTIES

(75) Inventors: Jaideva C. Goswami, Houston, TX (US); Denis J. Heliot, Sugar Land, TX (US); Jacques R. Tabanou, Houston, TX (US); Christopher E. Morriss, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 212 days.

(21) Appl. No.: 10/339,506

(22) Filed: Jan. 9, 2003

(65) Prior Publication Data

US 2004/0138819 A1 Jul. 15, 2004

(51) Int. Cl.[7] ................................. G01V 9/00
(52) U.S. Cl. ...................................... 702/10
(58) Field of Search ................ 702/6, 7, 10; 703/10; 324/338, 339, 343

(56) References Cited

U.S. PATENT DOCUMENTS

| | | | |
|---|---|---|---|
| 4,764,904 A | 8/1988 | Salomonsen et al. | |
| 4,800,539 A | 1/1989 | Corn et al. | |
| 4,953,142 A | 8/1990 | Rimmer | |
| 4,962,490 A | 10/1990 | Lyle et al. | |
| 4,984,220 A | 1/1991 | Bodine et al. | |
| 5,210,691 A | * 5/1993 | Freedman et al. | 702/7 |
| 5,432,751 A | 7/1995 | Hildebrand | |
| 5,570,106 A | 10/1996 | Viswanathan | |
| 5,867,806 A | * 2/1999 | Strickland et al. | 702/7 |
| 5,983,163 A | 11/1999 | Waid et al. | |
| 6,278,949 B1 | 8/2001 | Alam | |
| 6,393,364 B1 | 5/2002 | Gao et al. | |

* cited by examiner

Primary Examiner—Donald McElheny, Jr.
(74) Attorney, Agent, or Firm—Kevin P. McEnaney; Brigitte L. Echols (57) ABSTRACT

A method for determining a formation dip angle including extracting features from an acquired well log to obtain a set of features, validating the set of features to obtain a subset of features, generating a layered model using the subset of features, and generating a synthetic log using the layered model and a forward model.

28 Claims, 6 Drawing Sheets

METHOD AND APPARATUS FOR DETERMINING REGIONAL DIP PROPERTIES

BACKGROUND OF INVENTION

Information about formation dip angles ("dip angles") is a very important issue in oilfield exploration. In particular, dip angle information is used to determine the location of particular zones (e.g., shale zone, sand zone, etc.) within a formation. This information is subsequently used to determine whether a well is being drilled or can be drilled in an appropriate formation.

Dip angles are typically measured on a small scale (i.e., a few centimeters) or on a large scale (i.e., tens of meters). The measurement of dip angles on a small scale is typically conducted using well logging tools such as a Fullbore Formation MicroImager (FMI) tool, a Dipmeter tool, etc. The measurement of dip angles on a large scale is typically conducted using seismic equipment. Multiple well logs from one or multiple tools are typically required to determine the dip angles for a particular formation.

Dipmeters make high resolution micro-resistivity measurements around the borehole circumference, which are correlated to produce dip information. This is merged with tool orientation/navigation data to provide formation dips in the earth's frame of reference.

Dipmeters are commonly made in two sections. A lower caliper arm sub-section contains the mechanism for holding the dipmeter pads against the borehole wall, and the pads contain the micro-resistivity electrodes. An upper sub-section contains the magnetometers and level cells or accelerometers necessary to define the orientation of the tool in three dimensions. The two sections are joined in such a way as to prevent relative rotation.

A minimum of three circumferential measurements are needed to define a plane. Traditional slim dipmeters therefore have 3-arms 120° apart. Each caliper arm terminates in a pad from which a resistivity measurement is made. The pads themselves are made as short as possible to allow them to enter small cavities. Resistivities are measured with small laterolog-3 type arrays. The sense electrodes are typically located some distance above the caliper arms and sense the current returning to the body of the dipmeter. Pad traces are generally correlated automatically using an interval correlation technique. This can be augmented by machine-aided manual correlation.

A window of data on the reference pad (the "reference interval") is correlated with corresponding intervals on the other pads, plus or minus an additional amount of data defined by a search angle. The reference interval is then moved by an amount known as a step.

The reference interval is typically determined by the information content of the data. For example, if the pad traces are poor as a result of intermittent contact in rugose conditions, the best results may come from a short interval rather than a long one. However, as a general rule, stratigraphic interpretations are more accurate using a short interval. The step and interval usually overlap by some fraction, commonly a half, e.g., for a 2 meter interval, use a 1 meter step. Some overlap is justified because correlatable features may fall at or near an interval boundary, and might not result in an identifiable peak on the correlogram if there is no overlap. Comparing plots obtained with and without overlap may be useful; however, there is little or no justification for more than two fold overlap.

The search angle is the angle above and below the interval on the reference pad which, when projected across the well, defines the trace lengths from the other pads which enter the correlation algorithm. Therefore, the search angle defines the maximum apparent dip that can be computed. Note that search angles are defined with respect to the borehole, so the borehole tilt is subtracted to find the maximum true dip angle that can be computed in a vertical well.

Once the dipmeter tool has traversed the depth of the well, or the area of interest within the well, a plurality of resistivity logs is produced. There is typically one dip angle calculated per step. By properly correlating the fluctuations of these resistivity logs, the positioning of a bedding plane relative to the tool position can be readily calculated. Then, by measuring the bearing of the tool relative to some azimuthal reference, such as magnetic north, and the inclination of the tool relative to the true vertical or gravitational axis, the position of a bedding plane relative to the north and true vertical axes can be determined. To obtain an accurate dip angle, performing accurate correlations of a number of signals is generally necessary.

In addition, some prior art modeling methods combine information from offset well logs, production data, geologic maps and cross-sections to generate an initial geometric framework. The geometric framework typically includes a basic model providing of the formation. The geometric framework is subsequently augmented with estimates obtained from seismic data, more detailed correlation studies, log plots from the pilot hole, etc. The additional data from the offset wells and the pilot holes provide information about the layer thickness and various layer properties. The layer boundaries are typically determined from the inflection points on the offset well logs and the average layer properties are extracted from the corresponding well log values. Further, the dip angles associated with the layer model are typically derived using a combination of geologic maps and a cross-section of the formation, oriented along the wellbore.

SUMMARY OF INVENTION

In general, in one aspect, the invention relates to a method for determining a formation dip angle comprising extracting features from an acquired well log to obtain a set of features, validating the set of features to obtain a subset of features, generating a layered model using the subset of features, and generating a synthetic log using the layered model and a forward model.

In general, in one aspect, the invention relates to a computer system determining a formation dip angle comprising, a processor, a memory, a storage device, a computer display, and software instructions stored in the memory for enabling the computer system under control of the processor, to perform extracting features from an acquired well log to obtain a set of features, validating the set of features to obtain a subset of features, generating a layered model using the subset of features, and generating a synthetic log using the layered model and a forward model.

In general, in one aspect, the invention relates to a system for determining a formation dip angle comprising a well log data acquisition system for acquiring a well log, and a well log data processing system, wherein the well log data processing system extracts features from the acquired well log to obtain a set of features, validates the set of features to obtain a subset of features, generates a layered model using the subset of features, and generates a synthetic log using the layered model and a forward model.

In general, in one aspect, the invention relates to an apparatus for determining a formation dip angle comprising means for extracting features from an acquired well log to obtain a set of features, means for validating the set of features to obtain a sub-set of features, means for generating a layered model using the subset of features, and means for generating a synthetic log using the layered model and a forward model.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The present invention relates to a method for determining regional dip angles. Further, the present invention relates to using only one well log to determine the regional dip angles. Further, the present invention relates to generating a synthetic log and verifying the synthetic log to determine consistency with an original well log.

Figure 1:
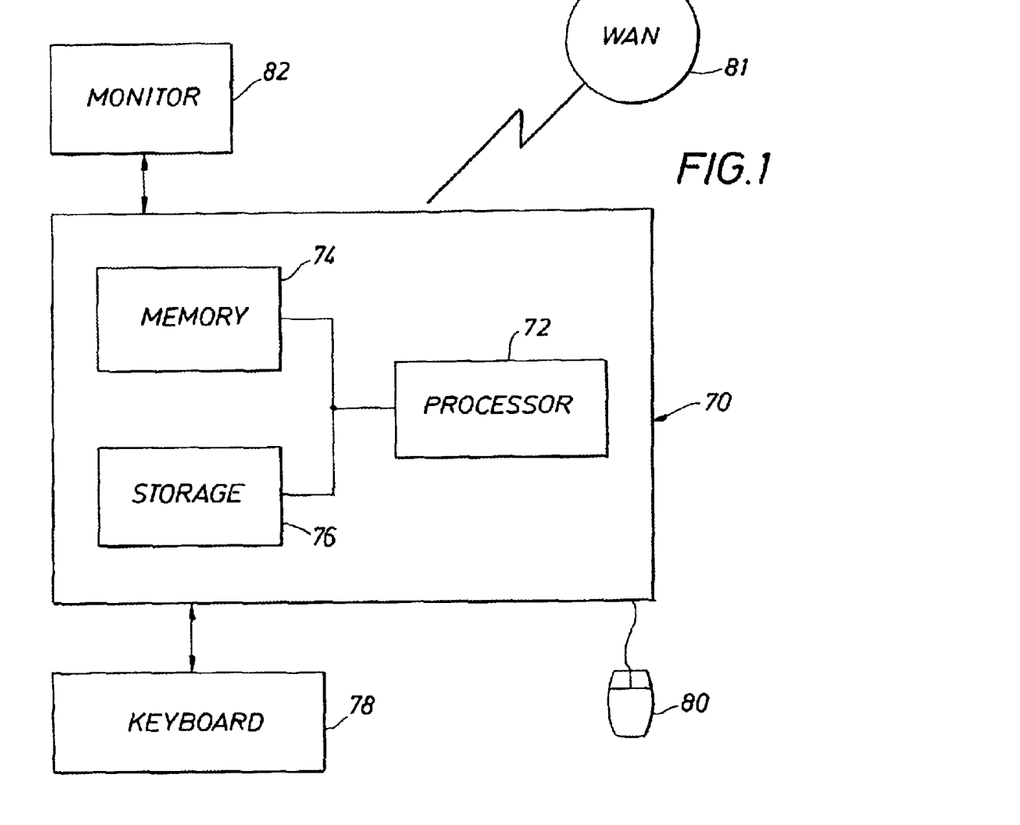
FIG. 1 illustrates a typical computer system.

The invention may be implemented on virtually any type computer regardless of the platform being used. For example, as shown in FIG. 1, a typical networked computer (70) includes a processor (72), memory (74), a storage device (76), and numerous other elements and functionalities typical of today's computers (not shown). The computer (70) may also include input means, such as a keyboard (78) and a mouse (80), and output means, such as a monitor (82). The networked computer system (70) is connected to a wide area network ("WAN") (81) (e.g., the Internet) via network interface connection (not shown). Those skilled in the art will appreciate that these input and output means may take other forms.

Figure 2:
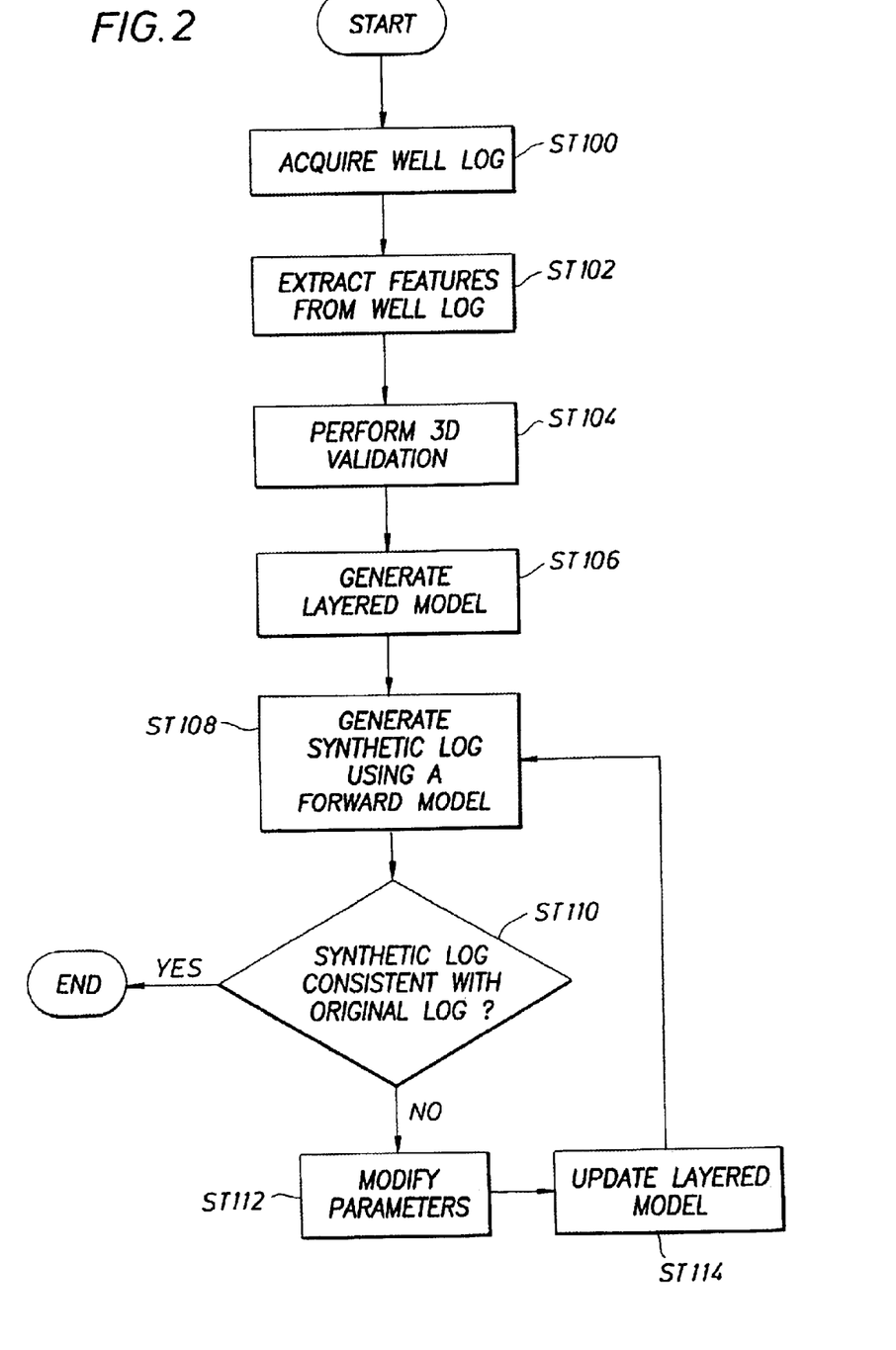
FIG. 2 illustrates a flow chart in accordance with one embodiment of the invention.

FIG. 2 illustrates a flow chart in accordance with one embodiment of the invention. Initially, a well logging tool such as an Array Resistivity Compensated Tool (ARC5) (ARC5 is a mark of Schlumberger) is used to obtain well log data such as resistivity (Step 100). Feature extraction is subsequently performed on the well log data (Step 102). The purpose of the feature extraction is to initially identify all potential layer boundaries ("horizons") within the formation being logged.

In one embodiment of the invention, feature extraction is performed using a mirror image extraction method that identifies the mirror image portions of the well log or regions that are nearly mirror images (i.e., similar images within an acceptable tolerance range) of the well log. One method for determining all the mirror images (or similar images) within a given well log is to define a well log as a function f(x) and use a second function d(τ,x) where d(τ,x):=f(x)−f(τ−x). It follows that d(τ,x) is the difference between the original well log, defined by the function f(x) and its reversed version (i.e., f(−x)) shifted by τ. Thus, if there are regions in f(x) that are mirror images, then for some set of τ, there are regions in d(τ,x) that will be zero (i.e., mirror images) or less than a certain pre-selected threshold (i.e., nearly mirror images). Accordingly, by varying τ, all possible mirror images or nearly mirror images within the well log may be identified.

In some cases, the identification of mirror images and/or nearly mirror images within a well log may be performed using a filtered log. In one embodiment of the invention, a wavelet decomposition method is used to obtain a filtered log prior to performing feature extraction as defined above. In the wavelet decomposition method, a continuous signal (i.e., the well log), f(x), is first mapped into $f_M \in V_M$ where $V_M$ represents a space spanned by $\{\phi(2^M x-k):k\in Z\}$ and $Z:=\{\ldots,-1,0,1,\ldots\}$. The resolution, M, is determined by a sampling rate. The function $\phi$ is a scaling function and has low pass filter characteristics. $f_M$ is passed through a series of low pass filters, $\phi$, and high pass/wavelet filters, $\psi$, to produce the filtered log. The mapping step f(x) α $f_M$ is described in more detail below.

$$f \alpha f_M = \sum_k a_{k',M} \phi(2^M x - k) \in V_M$$

$$f_M = f_{M-1} + g_{M-1}$$
$$= f_{M-2} + g_{M-2} + g_{M-1}$$
$$= f_{M-N} + g_{M-N} + \Lambda + g_{M-1}$$

where, for j<M, $$V_j \ni f_j = \sum_k a_{k,j} \phi(2^j x - k)$$

$$W_j \ni g_j = \sum_k w_{k,j} \psi(2^j x - k),$$

and $W_j$ represents a space spanned by $\{\psi(2^M x-k):k\in Z\}$. Based on the above formulas, the signal is downsampled by a factor of 2 after each filtering iteration. The resulting low pass filtered signal ($\phi$) is further divided into low pass and high pass filter components during the next iteration. Thus, if an original log has 2991 data points, after four iterations (i.e., four decompositions), the resulting filtered log only has 190 data points.

Figure 3A:
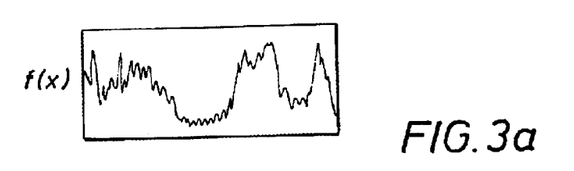
FIGS. 3a–3i illustrate the application of the wavelet decomposition method to a well log in accordance with one embodiment of the invention.
Figure 3B:
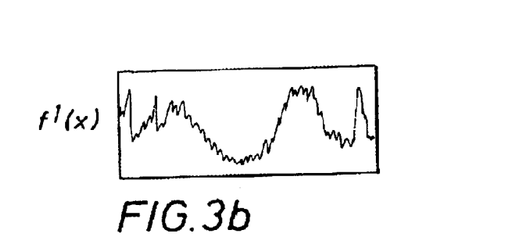
Figure 3C:
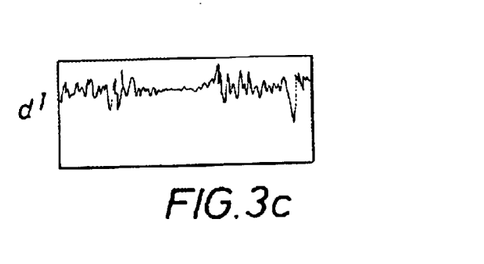

FIGS. 3a–3j illustrate the application of the wavelet decomposition method to a well log in accordance with one embodiment of the invention. The initial well log, shown in FIG. 3a, contains 2991 data points. During a first pass through the high pass filter and the low pass filter, in accordance with the wavelet decomposition method described above, the well log f(x) (as shown in FIG. 3a) is down sampled by a factor of 2, via the low pass filter, to produce $f^1(x)$ as shown in FIG. 3b. The difference $d^1$ between f(x) and $f^1(x)$ is shown in FIG. 3c.

Figure 3D:
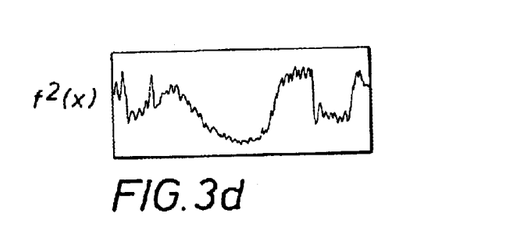
Figure 3E:
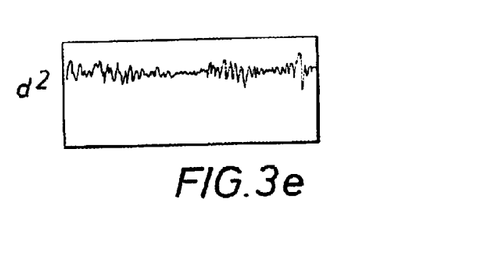
Figure 3F:
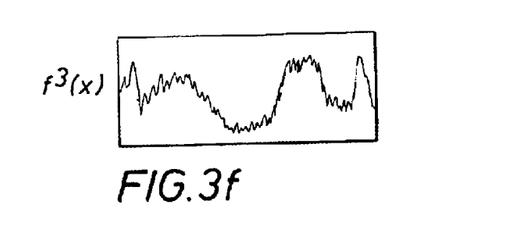
Figure 3G:
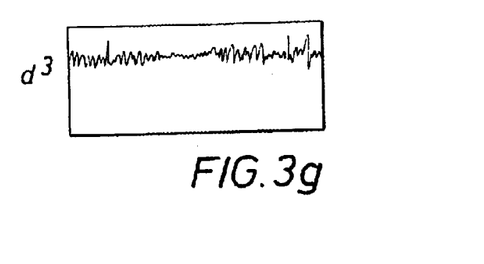
Figure 3H:
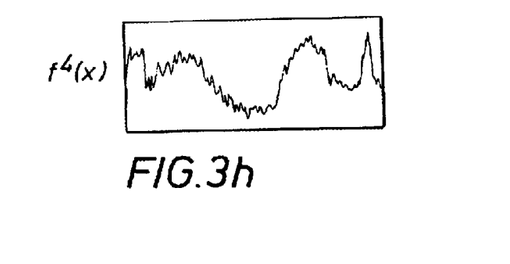
Figure 3I:
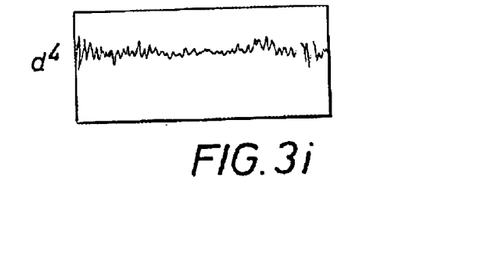

The filtered well log shown in FIG. 3b now contains only 1497 data samples. The filtered log shown in FIG. 3b is then subject to a second pass of the low pass filter and the high pass filter to produce FIGS. 3d and 3e, respectively. Similar to FIGS. 3b and 3c, FIG. 3d shows $f^1(x)$ down sampled by a factor of 2 to produce $f^2(x)$ and FIG. 3e shows the difference ($d^2$) between $f^1(x)$ and $f^2(x)$. The process is repeated to subsequently produce $f^3(x), d^3$, and $f^4(x), d^4$ (FIGS. 3f–3i, respectively). While FIGS. 3a–3i show the wavelet decomposition method being applied four times to the original well log (FIG. 3a), those skilled in the art will appreciate that the wavelet decomposition method may be applied any number of times.

Figure 4:
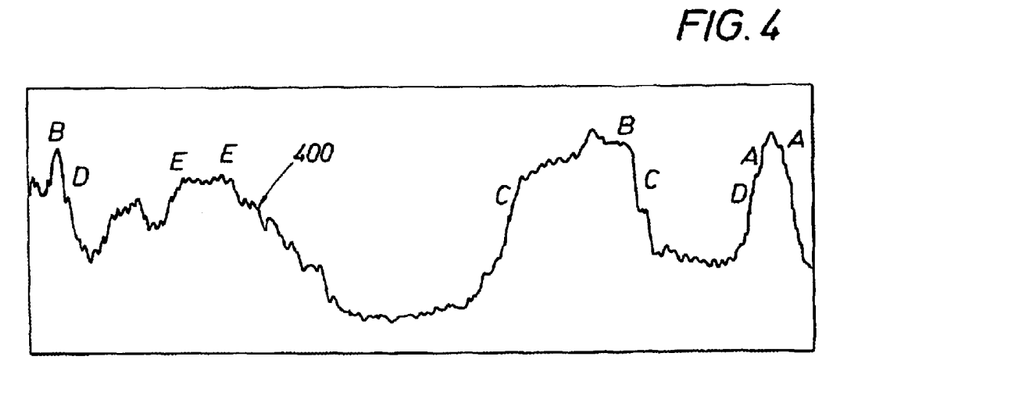
FIG. 4 illustrates the results of feature extraction using the mirror image method after the well log has been filtered using the wavelet decomposition method.

FIG. 4 illustrates the results of feature extraction using the mirror image method after the well log has been filtered using the wavelength decomposition method. The filtered well log (400) contains five mirror images denoted as A—A, B—B, C—C, D—D, and E—E. The filtered well log is the result of applying the wavelet decomposition method to the well log shown in FIG. 3a.

Another method that may be used for feature extraction is a squaring log method. Using this method, similar features are extracted by first squaring the log (i.e., representing the original log as a series of piecewise constant regions), and then using the regions with large amplitude variations as templates for cross correlating with the reversed square log representation of the original well log to identify similar features. Alternatively, the squared log is maintained and the template is reversed.

Figure 5:
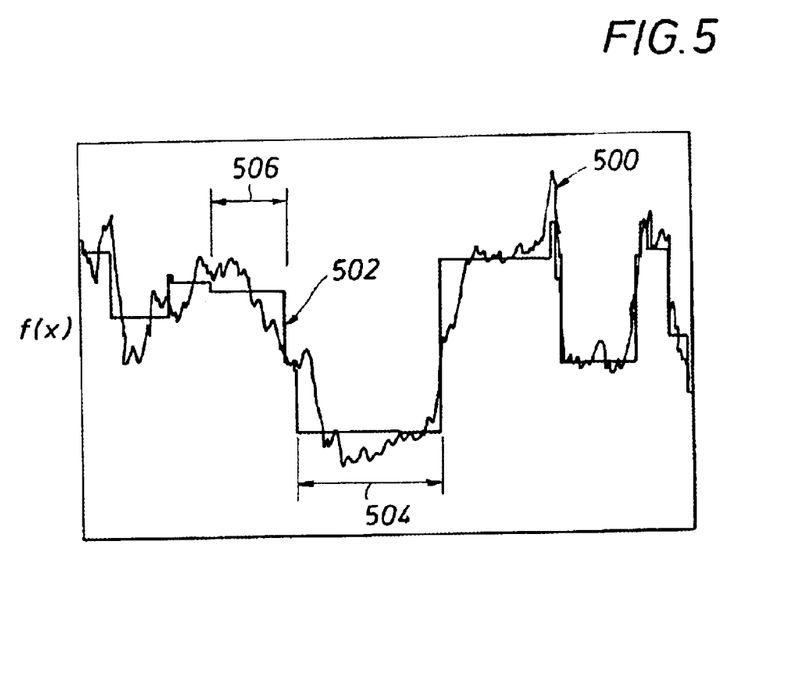
FIG. 5 illustrates the application of a square log method to a well log prior to feature extraction in accordance with one embodiment of the invention.

FIG. 5 illustrates the application of a square log method to a well log prior to feature extraction in accordance with one embodiment of the invention.

The well log (500) is approximated using a piecewise continuous approximation (502). The piecewise continuous approximation (502) is a series of segments (i.e., 504, 506). The piecewise approximation (502) may be determined using a pre-determined number of segments or using an error tolerance between the well log (500) and the piecewise continuous approximation (502). In the latter case, the well log will be segmented until the error tolerance is met.

Another method that may be used for feature extraction is a multiple-log method. The multiple-log method overlays multiple logs, such as phase and attenuation resistivity logs, and extracts features by determining where the logs separate. In the particular case of phase and attenuation resistivity logs, the regions where the well log curves start separating indicate resistivity boundaries. These separations may be used to identify similar features, such as bed boundaries.

Figure 6:
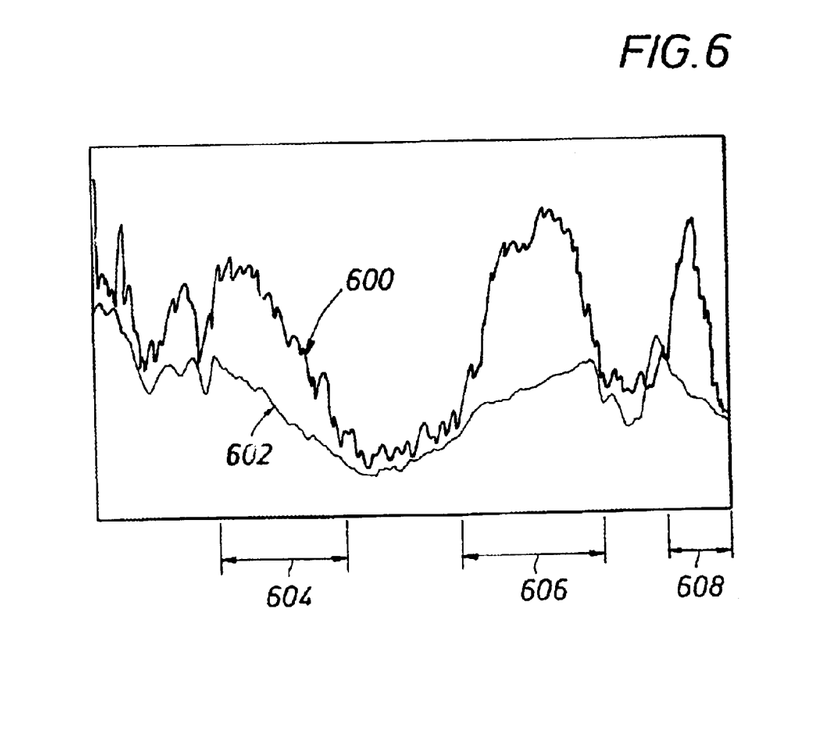
FIG. 6 illustrates feature extraction using the multiple-log method in accordance with one embodiment of the invention.

FIG. 6 illustrates feature extraction using a multiple-log method in accordance with one embodiment of the invention. The phase resistivity log (600) is overlaid on the attenuation resistivity log (602). Separations (604, 606, and 608) between the phase resistivity log (600) and the attenuation log (602) indicate that a horizon may be present.

Returning to FIG. 2, once the features have been extracted, three-dimensional (3D) validation is performed (Step 104). The purpose of the 3D validation process is to determine which of the potential horizons represents an actual layer boundary within the formation. During the 3D validation process, additional information is correlated with the extracted features. The additional information may include, but is not limited to, tool trajectory. Once the extracted features are correlated with the well log data, the results are validated using specific pre-defined criteria. The pre-defined criteria may include but is not limited to, magnitude of extracted feature, inconsistent inclination, whether particular extracted feature represents a layer that crosses another layer (i.e., the extracted feature represent nonphysical feature), etc.

Using the results of the 3D processing step, a layer model is generated (Step 106). The layer model is generated using the extracted features that are validated during the 3D validation process. Each layer is assigned specific properties based on the well log data. For example, if the ACR5 tool was used to generate the original well log, then the layered model would include a median resistivity for each layer.

Using the wavelet decomposition method and the mirror image method, five features were extracted from the well log (A—A, B—B, C—C, D—D, E—E) as shown in FIG. 5. Using the tool trajectory and the 3D validation method described above, the following layer model was generated as shown in FIG. 6 in accordance with one embodiment of the invention. Using the tool trajectory (600) and the 3D validation method described above, features A—A and C—C correspond to physical layers, while features B—B, D—D, and E—E provide inconsistent inclination or result in a crossing of a formation layer. Accordingly, features B—B, D—D, and E—E are deemed nonphysical. Using the trajectory (600) and features A—A and C—C, a layer model with four layers (602, 604, 606, 608) having resistivities, 25 Ω-m, 15 Ω-m, 29 Ω-m, and 9 Ω-m, respectively, is generated. The resistivity values are determined, as mentioned before, from the median log data in each of the respective layers. Those skilled in the art will appreciate that any number of features may be extracted from the well log and used to generate a layer model with any number of layers.

Returning to FIG. 2, a synthetic log is subsequently generated using a forward model and the information from the layered model (Step 108). Any number of forward models may be used to generate the synthetic log. For example, one may use an electromagnetic forward model to generate the synthetic log. The synthetic log is then compared to the original log, or alternatively to the filtered log (Step 110).

Figure 7:
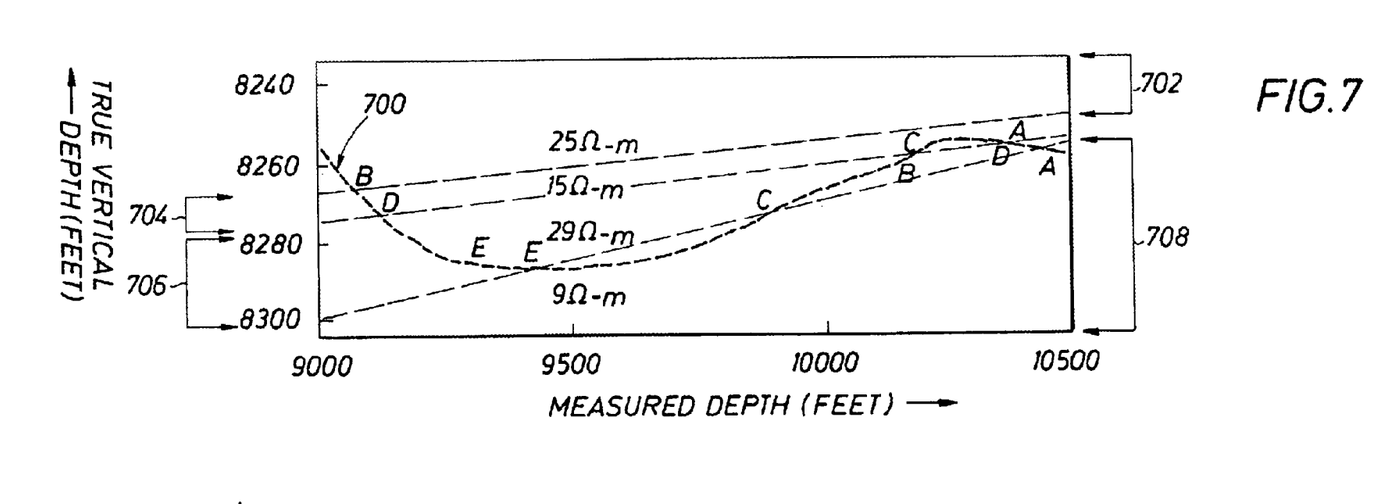
FIG. 7 illustrates a layer model in accordance with one embodiment of the invention.
Figure 8:
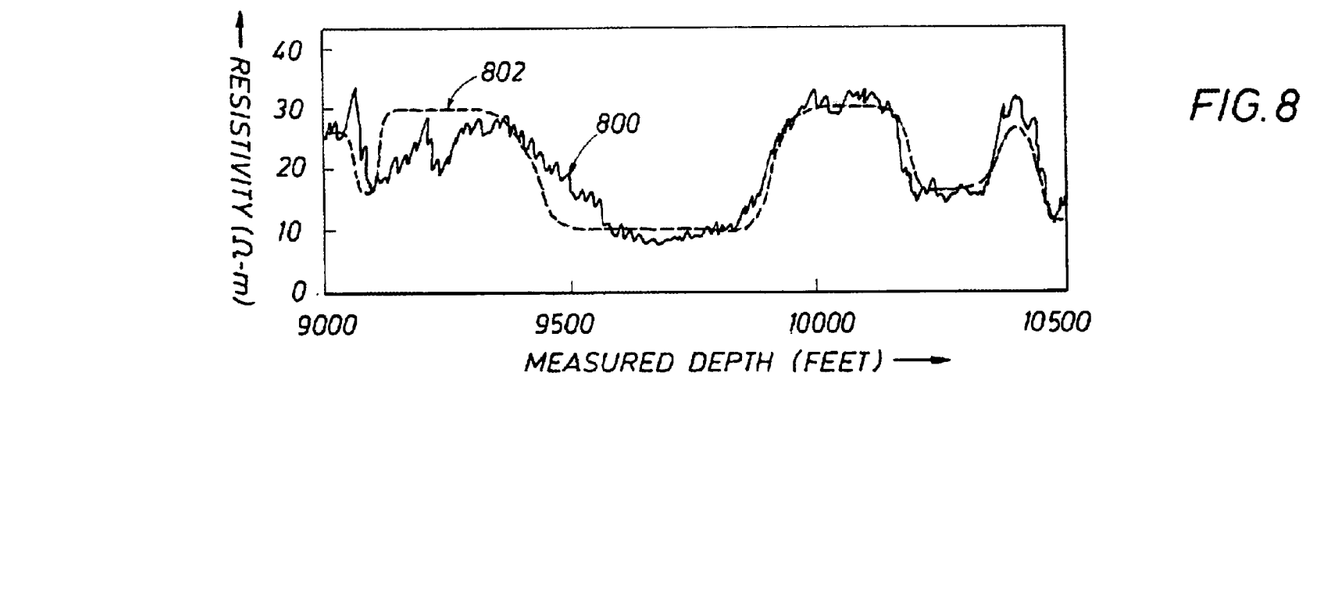
FIG. 8 illustrates a measured log and a synthetic log generated using the layer model shown in FIG. 7 and a forward model in accordance with one embodiment of the invention.

FIG. 8 illustrates a synthetic log generated using the layer model shown in FIG. 7 and a forward model in accordance with one embodiment of the invention. The original well log (800) is overlaid with a synthetic log (802) generated using the layered model in FIG. 6 and a forward model.

Returning to FIG. 2, in one embodiment of the invention, the synthetic log should be within an acceptable threshold of the original log to be considered consistent. If the synthetic log is consistent with the original and/or filtered log, then the layered model is inferred to accurately reflect the formation surrounding the borehole. If the synthetic log is not consistent with the original log, then the parameters and assumptions used to generate the layered model are modified using the synthetic log as a starting point (Step 112) and an updated layer model is subsequently generated (Step 114). Once the layer model has been updated, a synthetic log is generated using the updated layer model (Step 108), and subsequently compared to determine whether the synthetic log is consistent with the original well log or filter log (Step 110). Steps 108–114 are repeated until the synthetic log is consistent with the original and/or filtered well log. The result of the process shown in FIG. 2 is a formation model.

Figure 9:
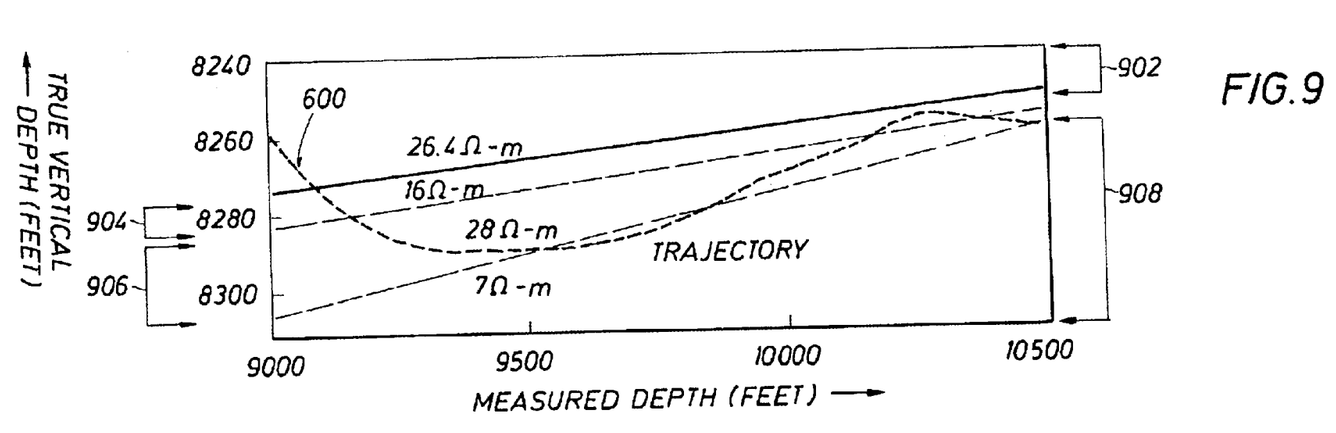
FIG. 9 illustrates an updated layer model using the synthetic log shown in FIG. 8.
Figure 10:
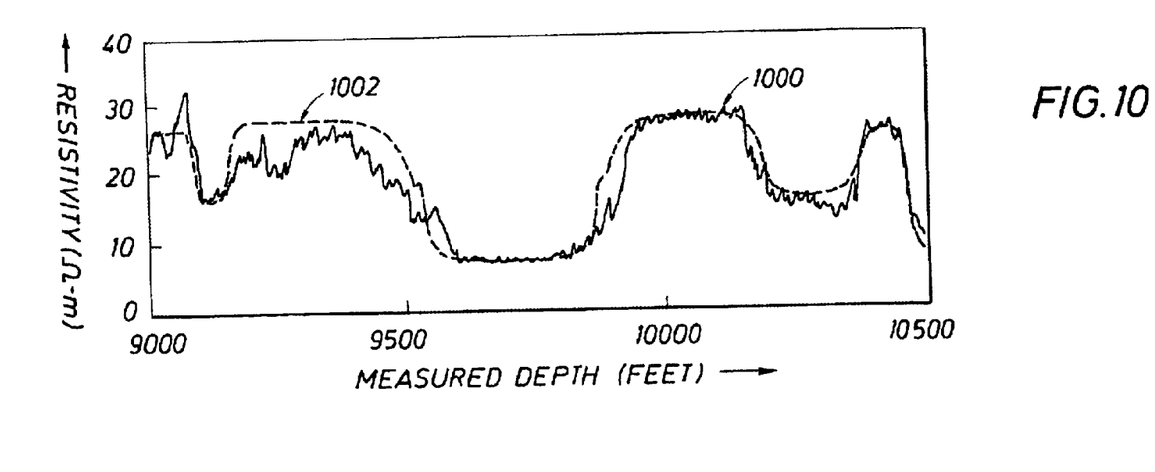
FIG. 10 illustrates a measured log and a synthetic log generated using the updated layer model shown in FIG. 9 and a forward model in accordance with one embodiment of the invention.

FIG. 9 illustrates an updated layer model in using the synthetic log shown in FIG. 8. Using the trajectory (600) and features A—A and C—C, the layer model is updated to include four layers (902–908) having resistivities, 26.4 Ω-m, 16 Ω-m, 28 Ω-m, and 7 Ω-m, respectively. FIG. 10 illustrates a synthetic log generated using the layer model shown in FIG. 9 and a forward model according to one embodiment of the invention. The original well log (1000) is overlaid with a synthetic log (1002) generated using the layered model in FIG. 9 and a forward model.

Embodiments of the invention may have one or more of the following advantages. A series of methods to automatically extract features from a single well log are provided. Further, a method that uses a single log to estimate the subsurface regional dip in highly deviated wells that intersect specific horizons in at least two locations is provided. Moreover, more accurate formation information to allow for better tool positioning in geo-steering applications can be obtained. Further, a mechanism for real-time geo-steering is provided. In particular, in one aspect, once a layered model has been generated using the proposed method by processing log data up to certain measured depth, any new log data may be added to continuously monitor the model and correcting tool trajectory such that drilling may proceed in the desired layer. Additionally, a user is able to determine regional dip angles on an intermediate scale.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a formation dip angle comprising:
    extracting features from an acquired well log to obtain a set of features;
    validating the set of features to obtain a subset of features;
    generating a layered model using the subset of features; and
    generating a synthetic log using the layered model and a forward model.

2. The method of claim 1, further comprising:
    comparing the synthetic log to the acquired well log;
    modifying a parameter in the layer model;
    updating the layer model using the modified parameter; and
    generating an updated synthetic log.

3. The method of claim 1, wherein extracting features is performed using one selected from the group of a mirror image extraction method, a multiple-log method and a square log method.

4. The method of claim 3, wherein the mirror image extraction method comprises:
    representing the acquired well log as a continuous function; and
    comparing the continuous function to a mirror image of the continuous function to determine whether a mirror of at least one feature exists in the continuous function.

5. The method of claim 3, wherein the mirror image extraction method comprises:
    filtering the acquired well log to obtain a filtered log;
    representing the filtered log as a continuous function; and
    comparing the continuous function to a reverse of the continuous function to determine whether a mirror image of at least one feature exists in the acquired well log.

6. The method of claim 5, wherein filtering the acquired well log comprises using a wavelet decomposition method.

7. The method of claim 6, wherein the wavelet decomposition method comprises using a high pass filter and a low pass filter.

8. The method of claim 3, wherein the square log method comprises:
    representing the acquired well log as a piecewise constant function;
    cross-correlating the piecewise constant function to a reverse of the piecewise constant function to determine whether a mirror of at least one feature exists in the acquired well log.

9. The method of claim 8, wherein the piecewise constant function is determined using a pre-defined number of steps.

10. The method of claim 8, wherein the piecewise constant function is determined using an error tolerance.

11. The method of claim 1, wherein validating the set of features comprises using a tool trajectory.

12. The method of claim 1, wherein the layer model is used with a geo-steering application to position a tool.

13. The method of claim 1, wherein the layer model is used to correct a tool trajectory.

14. A computer system determining a formation dip angle comprising:
    a processor;
    a memory;
    a storage device;
    a computer display; and
    software instructions stored in the memory for enabling the computer system under control of the processor, to perform:
        extracting features from an acquired well log to obtain a set of features;
        validating the set of features to obtain a subset of features;
        generating a layered model using the subset of features; and
        generating a synthetic log using the layered model and a forward model.

15. The computer system of claim 14, further comprising:
    comparing the synthetic log to the acquired well log;
    modifying a parameter in the layer model;
    updating the layer model using the modified parameter; and
    generating an updated synthetic log.

16. The computer system of claim 14, wherein extracting features is performed using one selected from the group of a mirror image extraction method, a multiple-log method and a square log method.

17. The computer system of claim 16, wherein the mirror image extraction method comprises:
    representing the acquired well log as a continuous function; and
    comparing the continuous to a mirror image of the continuous function to determine whether a mirror of at least one feature exists in the continuous function.

18. The computer system of claim 16, wherein the mirror image extraction method comprises:

filtering the acquired well log to obtain a filtered log;

representing the filtered log as a continuous function; and comparing the continuous function to a reverse of the continuous function to determine whether a mirror image of at least one feature exists in the acquired well log.

19. The computer system of claim 18, wherein filtering the acquired well log comprises using a wavelet decomposition method.

20. The computer system of claim 19, wherein the wavelet decomposition method comprises using a high pass filter and a low pass filter.

21. The computer system of claim 16, wherein the square log method comprises:

representing the acquired well log as a piecewise constant function;

cross-correlating the piecewise constant function to a reverse of the piecewise constant function to determine whether a mirror image of at least one feature exists in the acquired well log.

22. The computer system of claim 21, wherein the piecewise constant function is determined using a pre-defined number of steps.

23. The computer system of claim 21, wherein the piecewise constant function is determined using an error tolerance.

24. The computer system of claim 14, wherein validating the set of features comprises using a tool trajectory.

25. The computer system of claim 14, wherein the layer model is used with a geo-steering application to position a tool.

26. The computer system of claim 14, wherein the layer model is used to correct a tool trajectory.

27. A system for determining a formation dip angle comprising:

a well log data acquisition system for acquiring a well log; and a well log data processing system, wherein the well log data processing system extracts features from the acquired well log to obtain a set of features, validates the set of features to obtain a subset of features, generates a layered model using the subset of features, and generates a synthetic log using the layered model and a forward model.

28. An apparatus for determining a formation dip angle comprising:

means for extracting features from an acquired well log to obtain a set of features;

means for validating the set of features to obtain a sub-set of features;

means for generating a layered model using the subset of features; and means for generating a synthetic log using the layered model and a forward model.

* * * * *